United States Patent [19]

Youngblood

[11] 3,728,526
[45] Apr. 17, 1973

[54] MEANS AND METHOD FOR CONTROLLING INDEPENDENT OPERATING PARAMETERS IN A PROCESS SYSTEM

[75] Inventor: Douglas J. Youngblood, Groves, Tex.

[73] Assignee: Texaco Inc., New York, N.Y.

[22] Filed: July 8, 1971

[21] Appl. No.: 160,692

[52] U.S. Cl..........235/151.1, 23/255 E, 208/DIG. 1, 235/150.1, 235/151.12
[51] Int. Cl..............................................G06f 15/46
[58] Field of Search....................235/151.12, 150.1, 235/151.1; 208/DIG. 1, 113; 23/230 R, 230 A, 252, 253 R, 253 A, 255 R, 255 E

[56] References Cited

UNITED STATES PATENTS

| | | | |
|---|---|---|---|
| 3,356,590 | 12/1967 | Johnson | 235/151.12 X |
| 3,428,528 | 2/1969 | Oglesby, Jr. et al. | 235/151.12 X |
| 3,464,914 | 9/1969 | Weekman, Jr. | 208/DIG. 1 |
| 3,602,701 | 8/1971 | Boyd, Jr. | 235/151.12 X |
| 3,619,377 | 11/1971 | Palmer | 235/151.12 X |

*Primary Examiner*—Joseph F. Ruggiero
*Attorney*—Thomas H. Whaley et al.

[57] ABSTRACT

A control system controls a process system for periodically changing the values of first and second independent operating parameters of the process by predetermined amounts when the system has determined that the increases will not cause any operating parameter of the process system to exceed a constraint value. Various variable operating parameters, including the first and second independent operating parameter, are sensed by sensors which provide corresponding signals. A pair of factors, related to resulting changes in the values of a dependent operating parameter due to changes in the independent operating parameters, is predetermined for each of the dependent operating parameters. Direct current voltages corresponding to the factors are multiplied by voltages corresponding to the predetermined changes in the independent operating parameters to provide outputs. Each output represents a resulting change in a different dependent operating parameter. Predicted signals for each dependent operating parameter are determined by summing an output with a signal from a corresponding sensor. The sensed values of the independent operating parameters are summed with the voltages corresponding to the predetermined increases to provide predicted value signals for the independent operating parameters. The predicted value of an operating parameter is compared with the operating parameter's constraint value. When the predicted values of the operating parameters associated with an independent operating parameter do not exceed the corresponding constraint values, the independent operating parameter is changed in value by the predetermined amount. When at least one predicted value of a dependent parameter associated with an independent operating parameter exceeds a corresponding constraint value, the independent operation parameter maintains its present value.

14 Claims, 4 Drawing Figures

MEANS AND METHOD FOR CONTROLLING INDEPENDENT OPERATING PARAMETERS IN A PROCESS SYSTEM

BACKGROUND OF THE INVENTION

1. Field of the Invention

The present invention relates to control systems in general and, more particularly, to a control system for a fluid catalytic cracking unit.

2. Description of the Prior Art

Control systems such as the type described in U.S. Pat. application Ser. No. 136,003, filed by R.A. Woodle on Apr. 21, 1971, and assigned to Texaco Development Corporation, assignee of tthe present invention, control a system so that operating parameters of that system do not exceed constraint values. However, the aforementioned control systems involved control of two operating parameters, one of which was dependent on the other.

The control system of the present invention controls a process by controlling two operating parameters that are independent of each other. The mode and concept of control of the system of the present invention is completely different than the control system of the aforementioned application. The Woodle control system changed the operating parameters and then determined the effect, whereas no operating parameter is changed in the present system until it is assured that a constraint value will not be exceeded.

The control system of the present invention further distinguishes over the Woodle control system by providing for the condition resulting when a predetermined increase in each independent operating parameter results in a dependent operating parameter exceeding its constraint value. The present system determines which independent operating parameter exceeds the constraint value by a greater amount and controls the independent operating parameters so that the major contributor is decreased in value while the minor contributor is increased in value provided that the resulting value of the dependent operating parameter does not exceed the constraint value.

SUMMARY OF THE INVENTION

A system controls a process so that independent and dependent operating parameters of the process do not exceed constraint values. The system includes a source providing outputs corresponding to predetermined changes in at least two independent operating parameters. A network provides groups of signals in accordance with the output from the source. Each group is associated with a different independent operating parameter and the signals in that group correspond to predicted values for different operating parameters and the associated independent operating parameter. A plurality of voltages is provided, each voltage corresponding to a constraint value for a different operating parameter. Comparators compare each signal corresponding to a predicted value for an operating parameter with the voltage corresponding to the constraint value for the operating parameter. Control means control the independent operating parameters in accordance with the comparison.

One object of the present invention is to optimize the operations of a process by moving independent operating parameters, which have fixed optimum directions, in their optimum directions as limited by process or unit constraint.

Another object of the present invention is to provide a control system for controlling a process so that the value of an operating parameter will not exceed a constraint value for the operating parameter.

Another object of the present invention is to provide a control system which includes sensors sensing various operating parameters of a process, a network for providing signals corresponding to predicted values for the operating parameters based on the sensed values, and comparators comparing the predicted values of the operating parameters with constraint values and changing the operating parameter when the predicted values based on the increase do not exceed constraint values.

Another object of the present invention is to provide a control system for controlling a process having at least two independent operating parameters.

Another object of the present invention is to provide a control system for a process having two independent operating parameters where the control system determines predicted values for the operating parameters based on predetermined changes in the independent operating parameters to control the process and when the predicted values for an operating parameter exceed the constraint value determine which independent operating parameter may be increased and which independent operating parameter may be decreased while avoiding exceeding the constraint value for the operating parameter.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

Figure 1:
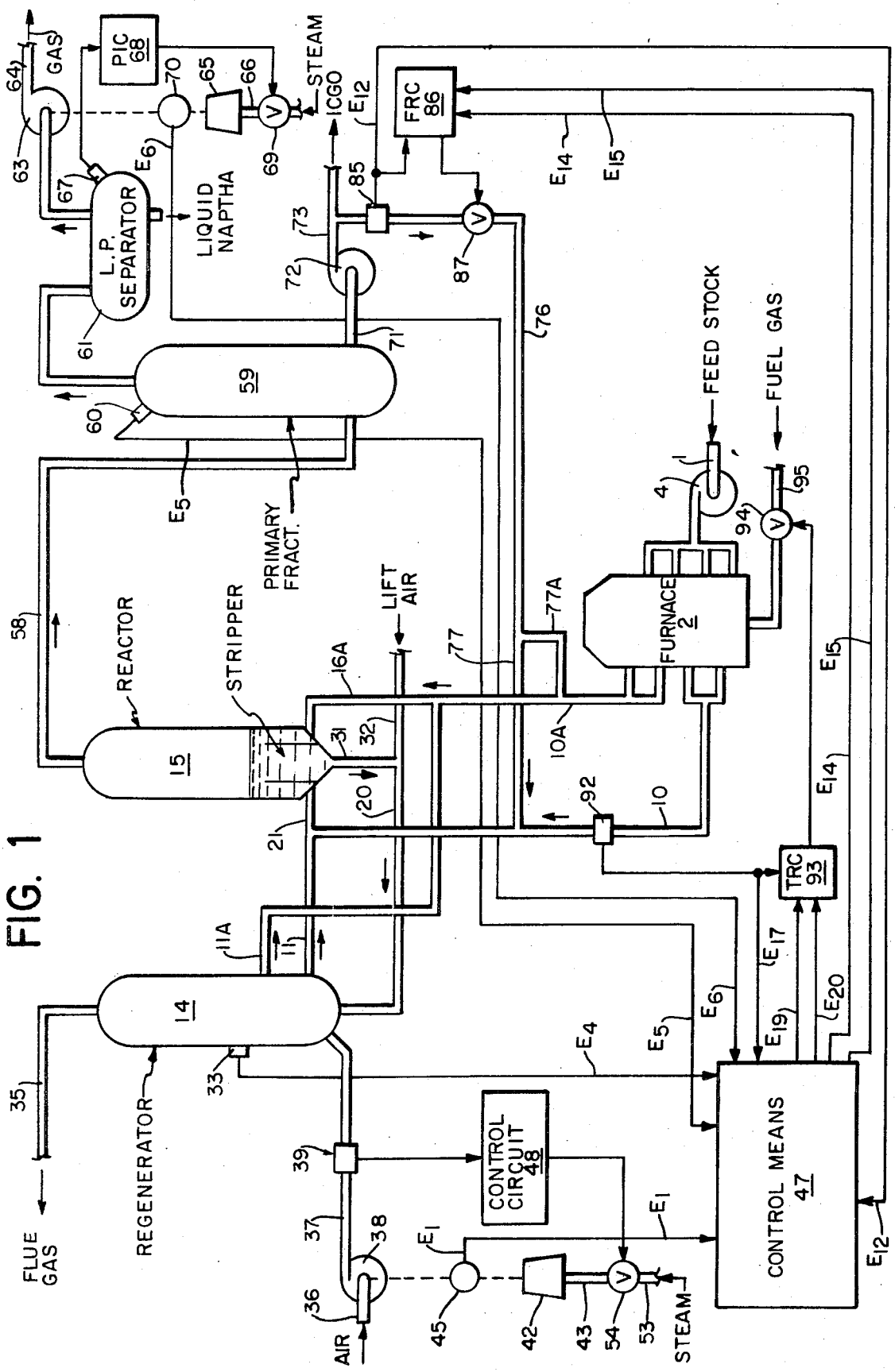
FIG. 1 is a simplified block diagram of a control system, constructed in accordance with the present invention, for controlling a fluid catalytic cracking unit which is also shown in partial schematic form.

Referring to FIG. 1, there is shown a fluid catalytic cracking unit. Only those elements pertaining to the disclosure of the system of the present invention are shown. Other elements which are not necessary to a conventional fluid catalytic cracking unit, are omitted for ease of explanation. Feedstock, which may be a gas oil, in a line 1 is pumped into a furnace 2 by a pump 4. The flow rate of the gas oil in line 1 is determined by overall refinery operation and is not controlled by the system of the present invention. Therefore, the driving means for pump 4 is not shown. The feedstock is heated to a predetermined temperature by furnace 2 and leaves by lines 10, 10A. Lines 11, 11A carry the fluid catalyst, from a regenerator 14, which commingles with the heated feedstock before entering a reactor 15 through lines 16 and 16A.

Spent catalyst leaves reactor 15 through line 31 after passing through a steam stripper which is shown as being part of reactor 15. Lift air entering by way of a line 32 carries the spent catalyst from line 31 to regenerator 14. The temperature of regenerator 14 is sensed by a sensor 33 which provides a corresponding signal $E_4$ to control means 47. The catalyst is revitalized in regenerator 14 by burning coke deposits from it. The quantity of air entering a line 36 and being pumped into regenerator 14 through a line 37 by a blower 38 controls the burning rate of the coke deposits. A sensor 39 provides a corresponding signal to the sensed flow rate of the air in line 37. Blower 38 is driven by a turbine 42 which in turn is driven by steam entering turbine 42 by way of line 43. A tachometer 45 provides a signal $E_1$ corresponding to the blower speed 38 to control means 47.

A control circuit 48 controls a valve 54 in line 43 in accordance with the signal from sensor 39, as disclosed in U.S. Pat. No. 3,410,973, issued to J. J. Stranahan et al. on Nov. 12, 1968 and assigned to Texaco Inc., to control the speed of blower 38. Control circuit 48 includes computer 32, device 102 and computer set station 111 of the Stranahan patent. Line 37, blower 38 and valve 54 correspond to line 98, blower 100 and valve 104, respectively, in the aforementioned patent. Sensor 39 corresponds to a sensor, not identified by number in the Stranahan patent, which is in line 98.

Effluent from reactor 15 leaves by way of a line 58 to a primary fractionator 59. The top temperature of primary fractionator 59 is sensed by a temperature sensor 60 which provides a corresponding signal $E_5$ to control means 47.

The top product of fractionator 59 leaves by way of a line 50 and enters a low pressure separator 61. Separator 61 provides liquid naphtha and gas. The gas is provided to a gas compressor 63 which discharges the gas into a line 64. Compressor 63 is driven by a turbine 65 receiving steam through a line 66. The speed of compressor 63 is controlled by a pressure sensor 67, a conventional pressure indicator controller 68 and a valve 69 in line 66. A change in the temperature of the preheated feedstock or in the recycle rate of an intermediate cycle gas oil, hereinafter referred to as the recycle gas oil, results in a change in pressure in fractionator 59. Pressure sensor 67 provides a signal corresponding to fractionator 59 pressure to pressure indicator controller 68. Controller 68 provides an error signal which is the difference between the sensed fractionator 59 pressure and a target pressure represented by the position of controller's 68 set points. The error signal from controller 68 operates valve 69 to control the steam in line 66, thereby affecting the speed of compressor 63. When the pressure in fractionator 59 increases, the speed of compressor 63 is increased to reduce the fractionator 59 pressure. When the pressure in fractionator 59 decreases, the speed of compressor 63 is reduced to increase fractionator 59 pressure. A tachometer 70 provides a signal $E_6$ which corresponds to the speed of compressor 63, to control means 47.

Another output from primary fractionator 59 is the intermediate cycle gas oil which leaves primary fractionator 59 by way of line 71. A pump 72 pumps the intermediate cycle gas oil through a line 73. A portion or all of the intermediate cycle gas oil is recycled through a line 76, which is divided into lines 77 and 77A, to lines 10 and 10A. Pump 72 runs at a substantially constant speed.

A flow sensor 85 senses the flow rate of the recycle gas oil in line 76 and provides a corresponding signal $E_{12}$ to control means 47 and to a flow recorder controller 86. The set point of flow recorder controller 86 is adjusted by signals $E_{14}$ and $E_{15}$ from control means 47. When signal $E_{14}$ is at a low level, any change in the set points of flow recorder controller 86 would be to decrease the recycle gas oil recycle rate, while a high level signal $E_{14}$ causes any change in the set points to increase the recycle gas oil recycle rate. Flow recorder controller 86 controls the recycle rate of the recycle gas oil by controlling its flow rate in line 76 with a valve 87, in accordance with a signal corresponding to the difference between the sensed flow rate and the target flow rate as determined by the position of the set points.

The temperature of the feedstock in lines 10, 10A is controlled by sensing the temperature of the gas oil in line 10 with a conventional sensor 92. Sensor 92 provides a signal $E_{17}$ to control means 47 and to a temperature recorder controller 93. Control means 47 provides signals $E_{19}$ and $E_{20}$ to temperature recorder controller 93 to adjust the set points of temperature recorder controller 93. Control means 47 provides signals $E_{19}$ and $E_{20}$ to temperature recorder controller 93 to adjust the set points of temperature recorder controller 93. When signal $E_{20}$ is at a low level, any change in the set points of controller 93 results in a decrease in the feedstock temperature while a high level signal $E_{20}$ causes any change in the set points to increase the feedstock temperature. Temperature recorder controller 93 provides a control signal to a valve 94 in line 95 which controls the fuel gas entering furnace 2 thereby controlling the feedstock temperature in lines 10, 10A. The control signal applied to valve 94 corresponds to the difference between the sensed gas oil temperature and the target gas oil temperature as determined by the position of temperature recorder controller 93 set points.

In operating the fluid catalyst cracking unit, it is desirable to operate at a maximum gas oil recycle rate and a maximum feedstock temperature, both of which are independent operating parameters, without exceeding constraint values for the operating parameters of the cracking process. Signal means 47 provides signals $E_{14}$, $E_{15}$ to adjust the set points of flow rate controller 86 and signals $E_{19}$, $E_{20}$ to adjust the set points of temperature controller 93 so as to control the recycle rate of the recycle gas oil and the feedstock temperature, respectively.

Figure 2:
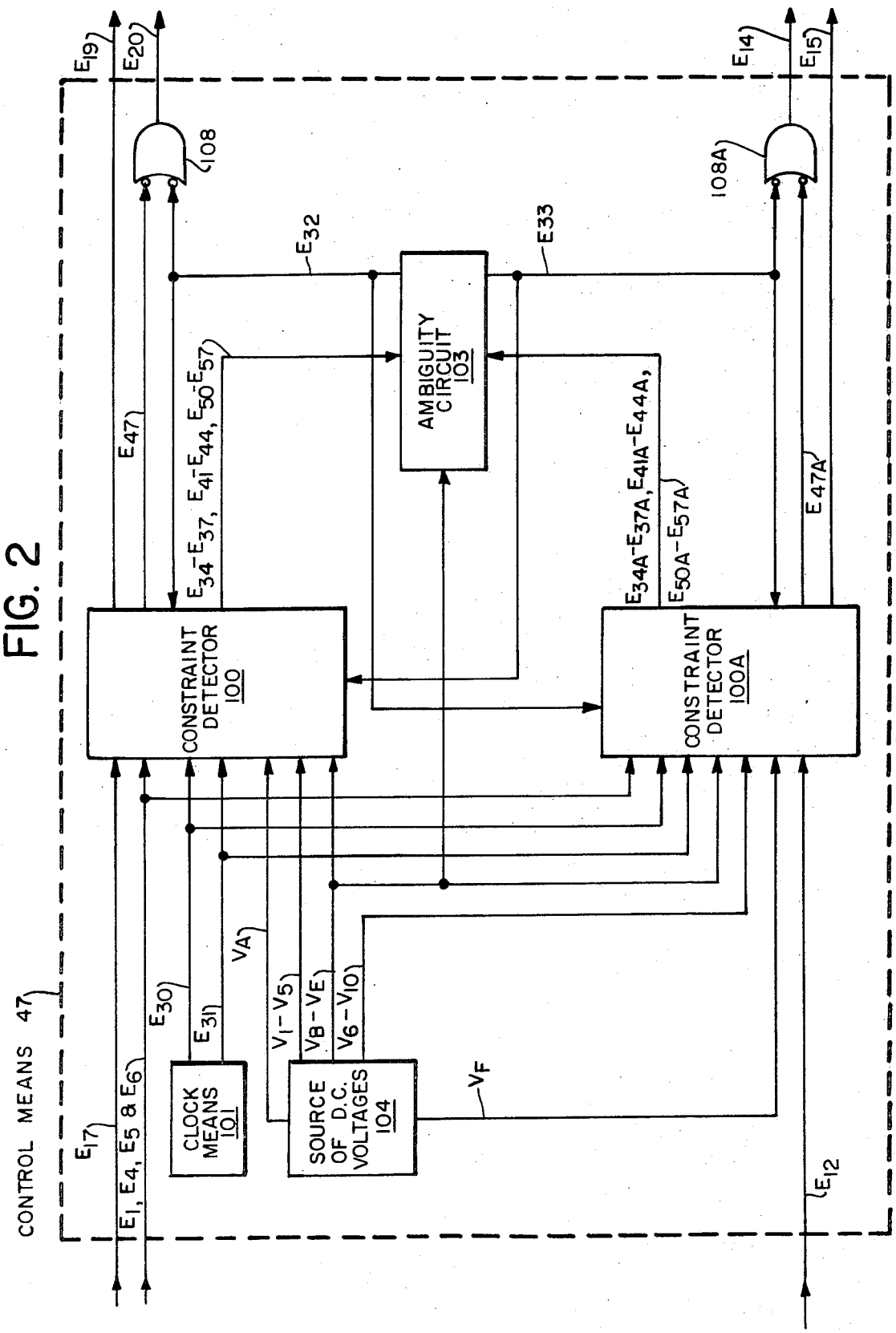
FIG. 2 is a detailed block diagram of the control means shown in FIG. 1.
Figure 3:
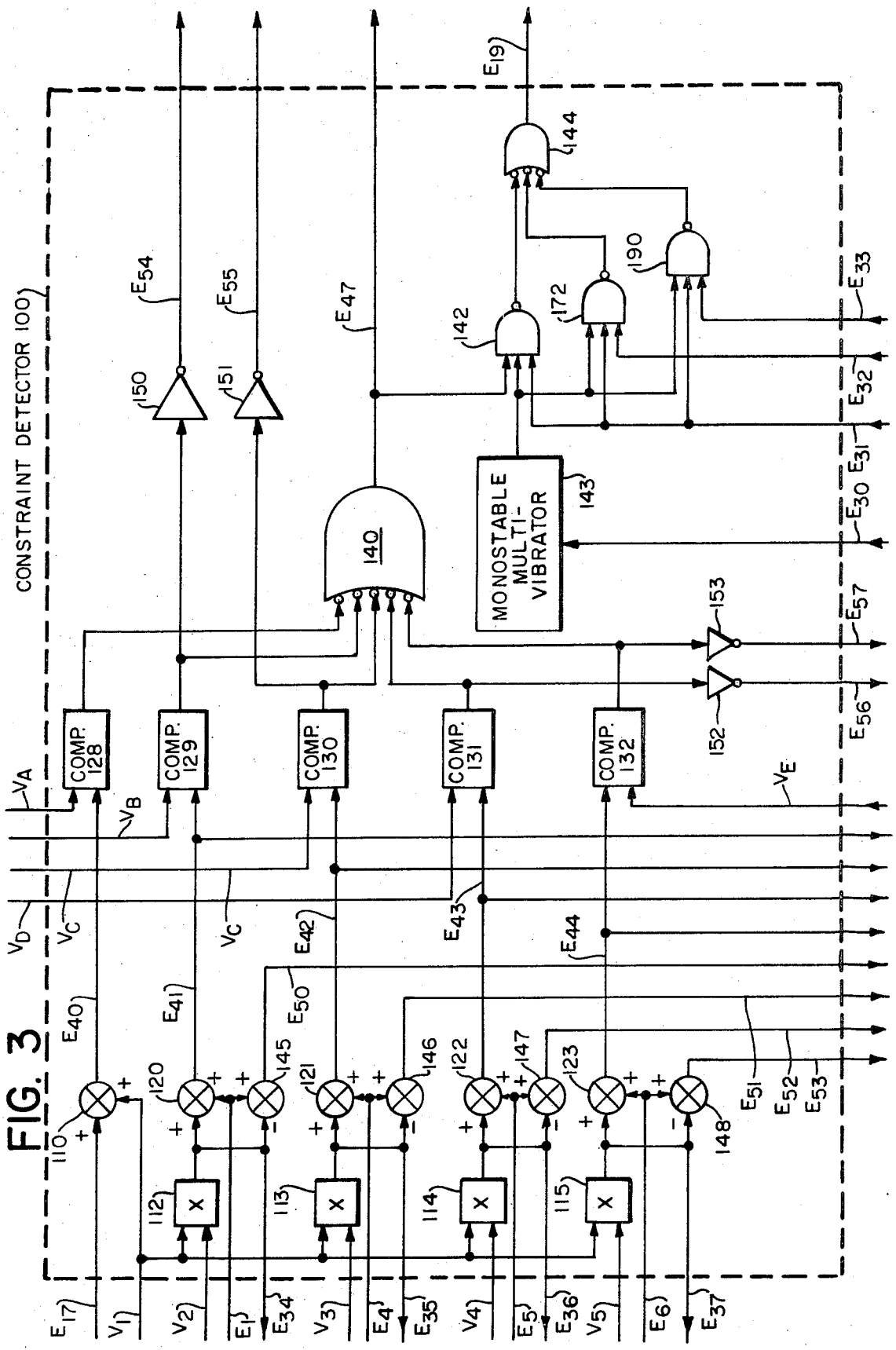
FIGS. 3 and 4 are detailed block diagrams of the constaint detector and the ambiguity circuit, respectively, shown in FIG. 2.

Referring to FIGS. 2 and 3, constraint detector 100 receives signals $E_1$, $E_4$, $E_5$, $E_6$ and $E_{17}$; clock pulses $E_{30}$ and timing pulses $E_{31}$ from clock means 101; signals $E_{32}$, $E_{33}$ from an ambiguity circuit 103; and direct current voltages $V_1$ through $V_5$ from a source 104 of direct current voltages. Constraint detector 100 determines predicted values for the operating parameters, except the gas oil recycle rate, in accordance with the predetermined increase in the feedstock temperature and controls temperature recorder controller 93 to increase the feedstock temperature in line 10, 10A when the predicted values of the operating parameters do not exceed the constraint values. Detector 100 cooperates with ambiguity circuit 103 and a NOR gate 108 to provide signals $E_{19}$, $E_{20}$.

Signal $E_{17}$ is summed with direct current voltage $V_1$, which corresponds to a predetermined change in the feedstock temperature, by summing means 110, to provide a signal $E_{40}$ corresponding to a predicted increased feedstock temperature. Voltage $V_1$ is also applied to multipliers 112 through 115 where it is multiplied with voltages $V_2$ through $V_5$. Voltages $V_2$ through $V_5$ correspond to factors for variable operating parameters of the cracking process, such as blower 38 speed, regenerator 14 temperature, fractionator 59 top tower temperature, and compressor 63 speed, respectively. When a factor is multiplied by the change in feedstock temperature, the product corresponds to the resulting expected change in a related operating parameter. Multipliers 112 through 115 provide signals $E_{34}$ through $E_{37}$, respectively, which correspond to incremental increases in the blower 38 speed, regenerator 14 temperature, fractionator 59 top tower temperature, and compressor 63 speed, respectively, for a predetermined increase in the feedstock temperature.

Summing means 120 through 123 sums the outputs of multipliers 112 through 115, respectively, with signals $E_1$, $E_4$, $E_5$ and $E_6$, respectively, to provide signals $E_{41}$ through $E_{44}$, respectively, which correspond to the predicted increased values of the operating parameters. Comparators 128 through 132 compare the outputs from summing means 110 and 120 through 123, respectively, with direct current voltages $V_A$ through $V_E$, respectively. Voltages $V_A$ through $V_E$ correspond to constraint values for the feedstock temperature, the blower 38 speed, regeneration 14 temperature, fractionator 59 top tower temperature, and compressor 63 speed, respectively, as determined from the physical design of the cracking unit. When a signal corresponding to a predicted value of an operating parameter is equal to or less than the constraint value, for that operating parameter, a corresponding comparator provides a high level direct current output. When the predicted value of an operating parameter exceeds the constraint value, the corresponding comparator provides a low level direct current output. A NOR gate 140 provides a high level direct current output $E_{47}$ when one or more comparators of comparators 128 through 132 provide a low level direct current output to NOR gate 140.

When none of the predicted values of the operating parameters exceed the constraint values, NOR gate 140 provides a low level direct current output $E_{47}$ in response to the high level outputs from comparators 128 through 132. Output $E_{47}$ is applied to NOR gate 108, which inverts output $E_{47}$ to a high level. NOR gate 108 provides the inverted output $E_{47}$ as signal $E_{20}$ to temperature reactor controller 93 for controlling the direction of change of the set point of controller 93.

Output $E_{47}$ from NOR gate 140 is applied to NAND gate 142. NAND gate 142 controls the changing of set points of temperature recorder controller 93 in accordance with the determination of whether the predicted value of an operating parameter exceeds the constraint value for an increase in the feedstock temperature. NAND gate 142 is partially enabled when output $E_{47}$ is at a high level and disabled when output $E_{47}$ is at a low level.

Clock pulses $E_{30}$ from clock means 101 periodically trigger a conventional type monostable multivibrator 143 which provides a pulse to NAND gate 142. When output $E_{47}$ is at a high level, the pulse from multivibrator 143 completely enables NAND gate 142 to pass timing pulses $E_{31}$ from clock means 101. The width of the pulse from multivibrator 143 is such as to allow a predetermined number of timing pulses to pass. The number of passed timing pulses corresponds to the predetermined change in the temperature of the feedstock in lines 10, 10A. The passed timing pulses from NAND gate 142 pass through a NOR gate 144 as signal $E_{19}$ which is applied to the set point of temperature recorder controller 93 in a direction controlled by signal $E_{20}$.

Constraint detector 100A operates in a similar manner as constraint detector 100 except that it receives direct current voltages $V_6$ through $V_{10}$ in lieu of voltages $V_1$ through $V_5$ which correspond to predetermined factors which when multiplied with a predetermined change in the recycle gas oil recycle rate correspond to the resulting increases in blower 38 speed, regenerator 14 temperature, fractionator 59 top tower temperature, and compressor 63 speed, respectively. Detector 100A also receives signals $E_1$, $E_4$, $E_5$ and $E_6$; direct current voltages $V_B$ through $V_E$; voltage $V_F$ instead of voltage $V_A$; signal $E_{12}$ in lieu of signal $E_{17}$; clock pulses $E_{30}$ and timing pulses $E_{31}$ from clock means 101 and signals $E_{32}$, $E_{33}$ from ambiguity circuit 103.

Constraint detector 100A determines predicted values for the operating parameters, except the feedstock temperature, in accordance with the predetermined increase in the gas oil recycle rate, and controls flow recorder controller 86 to increase the gas oil flow rate in line 76 when the predicted values of the operating parameters do not exceed the constraint values. Constraint detector 100A provides output $E_{47A}$ to NOR gate 108A. NOR gate 108A provides signal $E_{14}$ instead of signal $E_{20}$. Detector 100A provides signal $E_{15}$ in the same manner as detector 100 provided signal $E_{19}$. Signals $E_{14}$, $E_{15}$ are applied to flow recorder controller 86 to control the recycle gas oil flow rate in line 76.

Detector 100 provides signals $E_{34}$ through $E_{37}$, $E_{41}$ through $E_{44}$ and $E_{50}$ through $E_{57}$ to ambiguity circuit 103. Signals $E_{50}$ through $E_{53}$ correspond to predicted values for the operating parameters for a predetermined decrease in the feedstock temperature, while signals $E_{54}$ through $E_{57}$ correspond to the determination as to whether the predicted values exceed constraint values. Subtracting means 145–148 subtracts signals $E_{34}$ through $E_{37}$, respectively, from signals $E_1$, $E_4$, $E_5$ and $E_6$, respectively, to provide signals $E_{50}$ through $E_{53}$. Detector 100A provides signals $E_{34A}$ through $E_{37A}$, $E_{41A}$ through $E_{44A}$ and $E_{50A}$ through $E_{57A}$ to ambiguity circuit 103 in a similar manner.

Circuit 103 determines if an ambiguous condition exists from signals $E_{54}$ through $E_{57}$ and $E_{54A}$ through $E_{57A}$. For example, when the predicted blower 38 speeds for an increase in the feedstock temperature and for an increase in the gas oil recycle rate exceed the blower 38 constraint speed, an ambiguous condition exists. It may be possible to decrease the feedstock temperature while increasing the gas oil recycle rate, or the feedstock temperature may be increased while decreasing the oil recycled rate, or the feedstock temperature and the gas oil recycle rate may not be increased.

Figure 4:
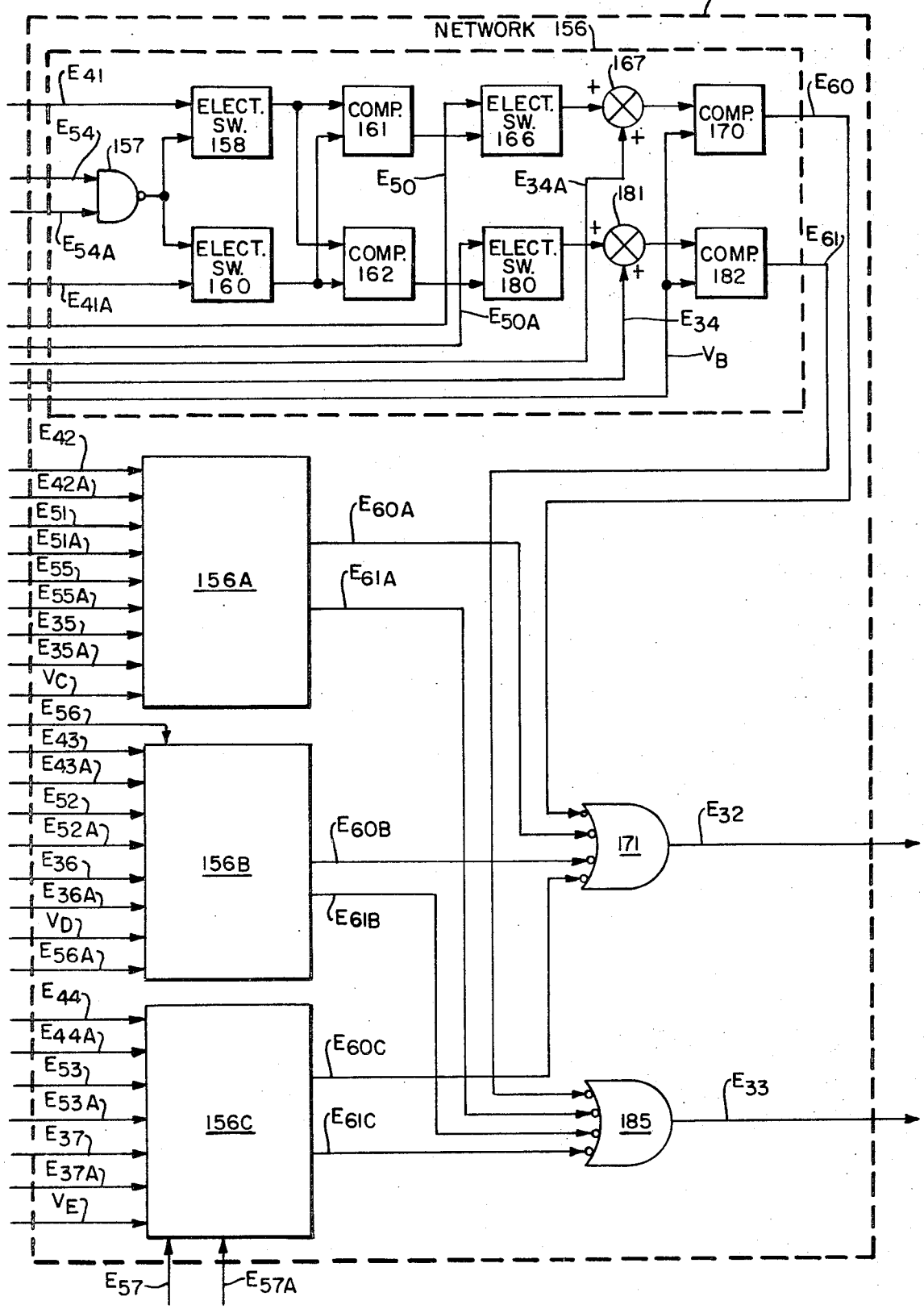

Referring to FIGS. 2, 3 and 4, a network 156 receives signals $E_{34}$, $E_{34A}$, $E_{41}$, $E_{41A}$, $E_{50}$, $E_{54}$ and $E_{54A}$ and voltage $V_B$. Network 156 determines if an ambiguous condition exists for blower 38 and provides signals $E_{60}$, $E_{61}$ in accordance with its determination. Signals $E_{54}$, $E_{54A}$ are applied to a NAND gate 157 which controls electronic switches 158, 160 which also receive signals $E_{41}$ and $E_{41A}$, respectively. When the predicted speeds for the blower 38 exceed the constraint speed, signals $E_{54}$ and $E_{54A}$ are at high level causing NAND gate 157 to render switches 158, 160 conductive. Switches 158 and 160, when rendered conductive, pass signals $E_{41}$ and $E_{41A}$, respectively, to comparators 161, 162. When either signal $E_{54}$ or $E_{54A}$, or both, are at a low level, NAND gate 157 renders electronic switches 158, 160 non-conductive to block signals $E_{41}$ and $E_{41A}$, respectively.

Comparators 161, 162 compare passed signals $E_{41}$, $E_{41A}$ from switches 158 and 160, respectively. Comparator 161 determines if the predicted blower 38 speed due to an increase in the feedstock temperature is greater than the predicted blower 38 speed due to an increase in the gas oil recycle rate. When signal $E_{41}$ is substantially greater than signal $E_{41A}$, electronic switch 166 is rendered conductive by an output from comparator 161 to passed signal $E_{50}$, which corresponds to a predicted reduced airblower 38 speed due to a predetermined decrease in the feedstock temperature, to summing means 167. When signal $E_{41}$ is not substantially greater than signal $E_{41A}$, switch 166 is rendered non-conductive to block signal $E_{50}$. Summing means 167 sums signal $E_{34A}$ with signal $E_{50}$, when it is passed by switch 166, to provide an output corresponding to a predicted blower 38 speed for the condition where the feedstock temperature is reduced by a predetermined amount while the gas oil recycle rate has been increased by a predetermined amount. The output from summing means 167 is compared with voltage $V_B$, corresponding to the constraint speed for blower 38, by a comparator 170. When the output from summing means 170 is less than voltage $V_B$, comparator 170 provides a low level output as signal $E_{60}$ to a NOR gate 171 which inverts the low level signal to provide signal $E_{32}$ as a high level signal. When the output from summing means 170 is less than voltage $V_B$, compartator 170 provides a low level output as signal $E_{60}$ to a NOR gate 171 which inverts the low level signal to 47signal $E_{32}$ as a high level signal. When the output from summing means 167 is substantially equal to or greater than voltage $V_B$, comparator 170 provides signal $E_{60}$ at a high level. Signal $E_{32}$, when at a high level partially enables a NAND gate 172. NAND gate 172 also receives clock pulses $E_{30}$ and timing pulse $E_{31}$ from clock means 101 and operates in the same manner as NAND gate 142 except that NAND gate 142 is controlled by signal $E_{32}$ instead of output $E_{46}$. Timing pulses $E_{31}$ passed by NAND gate 172, passes through NOR gate 144 to be provided as signal $E_{19}$.

Signal $E_{32}$ is also applied to NOR gate 108, but since signal $E_{32}$ and output $E_{47}$ are at a high level, signal $E_{20}$ provided by NOR gate 108 is at a low level. This causes the set points of temperature recorder controller 93 to be changed by signal $E_{19}$ in a direction to decrease the target feedstock temperature, thereby causing a decrease in the feedstock temperature.

Comparator 162, an electronic switch 180, summing means 181 and a comparator 182 cooperate in a manner similar to the cooperation of comparators 161 and 170, switch 166 and summing means 167, to provide signal $E_{61}$ in accordance with signals $E_{34}$ and $E_{50A}$ and voltage $V_B$. Signals $E_{60}$ and $E_{61}$ cannot be at a low level simultaneously, due to the operation of comparators 161 and 162, although they can be at a high level simultaneously. Thus when signal $E_{60}$ is at a low level, signal $E_{61}$ is at a high level. Usually only one operating parameter has an ambiguous condition, therefore signals $E_{61A}$, $E_{61B}$ and $E_{61C}$ are at high levels. Since signals $E_{61}$ through $E_{61C}$ have high levels, a NOR gate 185 provides signal $E_{33}$ at a low level which is inverted by NOR gate 108A and provided as a high level signal $E_{14}$. Since signal $E_{14}$ is at a high level, the gas oil recycle rate will increase in accordance with the adjustment of the set points of flow recorder controller 86 by signal $E_{15}$. The development of signal $E_{15}$ may be determined from the development of signal $E_{19}$ for the condition where the feedstock temperature is to be increased while the gas oil recycle rate is to be decreased, as hereinafter described.

When the predicted blower 38 speed for the predetermined increase in the gas oil recycle flow rate is substantially greater than the predicted speed for the predetermined increase in the feedstock temperature, and the output from summing means 181 is less than voltage $V_B$, signals $E_{60}$, $E_{61}$ are at a high level and a low level, respectively. For this condition, the gas oil recycle rate is decreased while the feestock temperature is increased. Signals $E_{32}$, $E_{33}$, therefore, are at a low level and a high level, respectively. Detector 100A and NOR gate 108A provide signals $E_{14}$ and $E_{15}$ in similar manner to detector 100 and NOR gate 108 development of signals $E_{19}$ and $E_{20}$ for increasing the gas oil recycle rate while decreasing the feedstock temperature condition. Therefore, since $E_{14}$ is at a low level, signal $E_{15}$ causes flow recorder controller 86 to decrease the gas oil recycle rate.

a NAND gate 190 is partially enabled by a high level signal $E_{33}$ and operates in a similar manner as NAND gate 142 in response to the output from multivibrator 143 to pass timing pulses $E_{31}$ to NOR gate 144, which in turn provides timing pulses $E_{31}$ as signal $E_{19}$. Since signals $E_{33}$, $E_{47A}$ are at a high level, NAND gate 108A provides a low level signal $E_{19}$ to flow recorder controller 86. When signal $E_{15}$ adjusts controller 86 set points it will be in a direction to decrease the flow rate of the gas oil due to signal $E_{14}$ being a low level signal.

When the two predicted blower 38 speeds exceed the constraint speed and are substantially equal, outputs $E_{47}$ are at a low level and signals $E_{60}$, $E_{61}$ are at a high level, therefore signals $E_{32}$, $E_{33}$ are at low levels so that NAND gates 142, 172, 190 in detector 100 are disabled and block timing pulses $E_{31}$. The same is true for the corresponding NAND gates in detector 100A. Since no timing pulses are being provided as signals $E_{15}$ and $E_{19}$, the feedstock temperature and gas oil recycle rate will not change.

Networks 156A, 156B and 156C, operating in a similar manner to network 156, provide signals $E_{60A}$ and $E_{61A}$, $E_{60B}$, $E_{61B}$, $E_{60C}$ and $E_{61C}$, respectively, for ambiguous conditions involving regenerator 14 temperature, fractionator 59 top tower temperature, and compressor 63 speed, respectively. Network 156A receives signals $E_{35}$, $E_{35A}$, $E_{42}$, $E_{51}$, $E_{51A}$, $E_{55}$ and $E_{55A}$, and voltage $V_C$. Network 156B receives signals $E_{36}$, $E_{36A}$, $E_{43}$, $E_{43A}$, $E_{52}$, $E_{52A}$, $E_{56}$ and $E_{56A}$ and voltage $V_D$. Network 156C receives signals $E_{37}$, $E_{37A}$, $E_{44}$, $E_{44A}$, $E_{53}$, $E_{53A}$, $E_{57}$ and $E_{57A}$ and voltage $V_E$.

The aforementioned control means 47 may be replaced with a general purpose digital computer. Signals $E_1$, $E_4$, $E_5$, $E_6$ and $E_{17}$ are converted to digital signals by conventional type analog-to-digital converters. The digital signals are applied to the digital computer which determines the predicted value $V_P$ for an operating parameter in accordance with the following equation:

$$V_P = V_S \pm F(\Delta V_{IOP}) \quad (1)$$

where $V_S$ is a sensed value of the operating parameter, $\Delta V_{IOP}$ is a desired incremental change in value of an independent operating parameter, and F is a factor associated with $\Delta V_{IOP}$ which, when multiplied with $\Delta V_{IOP}$ yields a term corresponding to a change in the operating parameter resulting from a change value $\Delta V_{IOP}$ in the independent operating parameter. The digital would also be programmed to compare the predicted values of each operating parameter with constraint values and provide signals $E_{14}$, $E_{15}$ to flow recorder controller 86 and signals $E_{19}$, $E_{10}$ to temperature recorder controller 93 to control the fluid cracking unit accordingly.

The digital computer would also be programmed to determine ambiguous conditions and resolve them as heretofore described for control means 47.

The system of the present invention as heretofore described controlled a process so that the value of an operating parameter will not exceed a constraint value for the operating parameter. The system included sensors sensing various operating parameters of the process, a network provided signals corresponding to predicted values for the operating parameters based on the sensed values, and comparators compared the predicted values of the operating parameters with the constraint values and increased independent operatng parameters with the predicted values for that operating parameter and others based on the increase did not exceed constraint values. The system of the present invention controlled a process having two independent operating parameters. The system of the present invention determined predicted values for the operating parameters based on predetermined changes in the independent operating parameters to control the process. When the predicted values for an operating parameter exceeded the constraint value the system determined which independent operating parameter may be increased and which independent operating parameter may be decreased while avoiding exceeding the constraing value for the operating parameters.

What is claimed is:

1. A system for controlling a process so that independent and dependent operating parameters of the process do not exceed constraint values, comprising means for providing outputs corresponding to predetermined changes in at least two independent operating parameters; means connected to the output means for providing groups of signals in accordance with the outputs from the output means, each group is associated with a different independent operating parameter and the signals in that group correspond to predicted values for different dependent operating parameters and the associated independent operating parameter; means for providing a plurality of voltages, each voltage corresponding to a constraint value for a different operating parameter; means connected to the voltage means and to the signal means for comparing each predicted value signal for an operating parameter with the voltage corresponding to the constraint value for the operating parameter and providing a corresponding output; means connected to the signal means and to the comparing means for determining if the predicted value signals for an operating parameter exceed the constraint value voltage for the operating parameter and whether an independent operating parameter may be changed in one direction with a corresponding change in the opposite direction in the other independent parameter and providing signals corresponding to the determination; and means for controlling the independent operating parameters in accordance with the outputs from the comparing means and signals from the determining means.

2. A system as described in claim 1 in which the process is the fluid catalytic cracking of feedstock where the feedstock is preheated by a furnace and mixed with a fluid catalyst from a regenerator before entering a reactor, one effluent from the reactor is spent catalyst which is returned to the regenerator where air entering the regenerator from a blower aids in the regeneration of the catalyst, while another effluent from the reactor is fed to a primary fractionator which provides a variety of hydrocarbon product streams including a gas oil that is recycled by a pump to be mixed with the feedstock before the feedstock enters the reactor and a top product stream, a portion of which is converted to a gas which is fed to a compressor.

3. A system as described in claim 2 in which one independent operating parameter is the temperature of the feedstock after preheating, another independent parameter is the recycle rate of the recycle gas oil, and the other operating parameters are the blower's speed, the regenerator's temperature, the compressor's speed and the fractionator top tower temperature.

4. A system as described in claim 3 in which the control means includes means having the recycle gas oil passing through it for regulating the recycle rate of the recycle gas oil, means connected to the comparing means and to the furnace for controlling the furnace to increase the preheated feedstock temperature when an output from the comparing means is of one level which corresponds to the condition that none of the one group of predicted value signals exceed a corresponding constraint value voltage, and to maintain the preheated feedstock temperature when the output is of another level which corresponds to the condition that at least one of the one group of predicted value signals exceeds a corresponding constraint value voltage; and second means connected to the comparing means and to the regulating means for controlling the regulating means to increase the recycle rate of the recycle gas oil when a second output from the comparing means is of one amplitude which corresponds to the condition that none of the other group of predicted value signals exceed a corresponding constraint value voltage, and to maintain the gas oil recycle rate when the second output from the comparing means is of another amplitude which corresponds to the condition that at least one of the other group of predicted value signals exceeds a corresponding constraint value voltage.

5. A system as described in claim 3 in which the signal means includes a plurality of sensors sensing the blower speed, the preheated feedstock temperature, the recycle rate of the recycle gas oil, the compressor speed, the regenerator temperature and the primary fractionator top tower temperature and providing signals corresponding thereto; second signal means for providing a plurality of signals, each signal corresponding to an increase in a dependent operating parameter as a function of a different independent operating parameter, and summing means, one summing means sums the first output from the output means with the signal from the sensors corresponding to the sensed preheated feedstock temperature to provide a predicted preheated feedstock temperature, another summing means sums the second output from the output means with the signal from the sensors corresponding to the sensed recycle rate of the recycle gas oil to provide a predicted gas oil recycle rate, and the remaining summing means sum each signal of the remaining signals from the sensors with corresponding signals from the second signal means to provide predicted value signals for the dependent operating parameter.

6. A system as described in claim 5 further comprising means connected to the signal means, to the comparing means and to the control means for determining if the predicted value signals for a dependent operating parameter exceed the constraint value voltage for the dependent operating parameter and if an independent operating parameter may be increased with a corresponding decrease in the other independent parameter and providing signals corresponding to the determination; and in which the regulating means and the temperature control means controls the recycle rate of the recycle gas oil and the preheated feedstock temperature, respectively, in accordance with the outputs from the comparing means and the signals from the determining means.

7. A method for controlling a process so that independent and dependent operating parameters of the process do not exceed constraint values, which comprises providing outputs corresponding to predetermined changes in at least two independent operating parameters; providing groups of signals in accordance with the output, each group is associated with different independent operating parameters and the signals in that group correspond to predicted values for different operating parameters and the associated independent operating parameters providing a plurality of voltages, each voltage corresponds to a constraint value for different operating parameters; comparing each predicted value signal for an operating parameter with the constraint value voltage for the operating parameter; determining if the predicted values for an operating parameter exceed the operating parameter constraint value, determining in accordance with the previous determination if one independent operating parameter may be changed in one direction with a corresponding change in the opposite direction in another independent operating parameter, controlling the independent operating parameters in accordance with the comparison of the signals and the voltages and the last mentioned determination.

8. A method as described in claim 7 which further comprises determining if the predicted value signals for a dependent operating parameter exceed the constraint value for the dependent operating parameter controlling switch means to pass the predicted value signals for a dependent operating parameter when it has been determined that the predicted value signals have exceeded the constraint value voltage for a dependent operating parameter and to block the predicted value signals when at least one predicted value signal has not exceeded the constraint value voltage for a dependent parameter and comparing the passed predicted value signals, and increasing one independent operating parameter while decreasing the other independent operating parameter when the comparison indicates the predicted value signal for the independent operating parameter is substantially less than the other predicted value signal associated with the other independent operating parameter and maintaining both independent operating parameters at their present value when the passed predicted value signals are substantially equal.

9. A method as described in claim 7 in which the process is the fluid catalytic cracking of feedstock where the feedstock is preheated by a furnace and mixed with a fluid catalyst from a regenerator before entering a reactor, one effluent from the reactor is spent catalyst which is returned to the regenerator where air entering the regenerator from a blower aids in the regeneration of the catalyst, while another effluent from the reactor is fed to a primary fractionator which provides a variety of types of hydrocarbon stream, and a portion of one type of hydrocarbon stream which is a gas oil is recycled by a pump to be mixed with the feedstock before the preheated feedstock enters the reactor, and a portion of another hydrocarbon stream is converted to a gas which is fed to a compressor.

10. A method as described in claim 9 in which the one independent operating parameter is the temperature of the preheated feedstock, another independent operating parameter is the recycle rate of the recycle gas oil, and the other operating parameters are the blower speed, the regenerator temperature, the compressor speed and the fractionator top tower temperature.

11. A method as described in claim 10 in which the control step includes controlling the furnace to increase the preheated feedstock temperature when the comparing step indicates that none of the one group of predicted value signals exceed a corresponding constraint value voltage, and to maintain the preheated feedstock temperature when the comparing step indicates that at least one of the one group of predicted value signals exceed a corresponding constraint value voltage, and to maintain the gas oil recycle rate when the comparing step indicates that at least one of the other groups of predicted value signals exceeds a corresponding constraint value voltage.

12. A method as described in claim 11 in which the signal providing step includes sensing the blower speed, the preheated feedstock temperature, the recycle rate of the recycle gas oil, the compressor speed, the regenerator temperature and the primary fractionator top tower temperature; providing signals corresponding to the sensed blower speed, the sensed preheated feedstock temperature, the sensed recycle rate of the recycle gas oil, the sensed compressor speed, the sensed regenerator temperature and the sensed primary fractionator top tower temperature; providing a second plurality of signals, each signal corresponding to an increase in a dependent operating parameter as a function of a different independent operating parameter; summing the first and second outputs with the sensed preheated feedstock temperature signal and the sensed gas oil recycle rate signal, respectively, to provide predicted value signals for the predicted feedstock temperature and for the gas oil recycle rate, respectively, summing each signal of the remaining sensed signals with corresponding signals from the second plurality of signals to provide predicted value signals for the dependent operating parameters.

13. A method as described in claim 12 which further comprises determining if the predicted values for a dependent operating parameter exceed the dependent operating parameter's constraint value, and determining in accordance with the previous determination if one independent operating parameter may be increased with a corresponding decrease in the other independent operating parameter, and the control step includes controlling the preheated feedstock temperature and the recycle rate of the recycle gas oil in accordance with the comparison of the signals and the voltages and the last mentioned determination.

14. A system for controlling a process so that independent and dependent operating parameters of the process do not exceed constraint values, comprising means for providing outputs corresponding to changes in at least two independent operating parameters; means connected to the output means for providing groups of signals in accordance with the outputs from the output means, each group is associated with a different independent operating parameter and the signals in that group correspond to predicted values for dependent operating parameters and the associating independent operating parameter; means for providing signals corresponding to constraint values for different operating parameters; first means connected to the output means, to the predicted value signal means and to the constraint value signal means for controlling the output means to provide outputs corresponding to changes in the independent operating parameters that cause the predicted value of at least one operating parameter to be substantially equal to, but not exceed, the constraint value for that operating parameter; and second control means connected to the output means for controlling the independent operating parameters in accordance with the outputs from the output means with the output from the comparing means and the signals from the determining means.

* * * * *